United States Patent
Fukushima (10) Patent No.: US 11,781,663 B2
(45) Date of Patent: Oct. 10, 2023

(54) PILOT CHECK VALVE

(71) Applicant: SMC CORPORATION, Tokyo (JP)

(72) Inventor: Kenji Fukushima, Tsukuba (JP)

(73) Assignee: SMC CORPORATION, Tokyo (JP)

( * ) Notice: Subject to any disclaimer, the term of this patent is extended or adjusted under 35 U.S.C. 154(b) by 0 days.

(21) Appl. No.: 18/048,109

(22) Filed: Oct. 20, 2022

(65) Prior Publication Data
US 2023/0132067 A1   Apr. 27, 2023

(30) Foreign Application Priority Data

Oct. 21, 2021   (JP) .................. 2021-172329

(51) Int. Cl.
 *F16K 15/18* (2006.01)
 *F16K 15/02* (2006.01)
 *F15B 13/02* (2006.01)
(52) U.S. Cl.
 CPC ........ *F16K 15/1826* (2021.08); *F15B 13/027* (2013.01); *F16K 15/021* (2013.01); *F16K 15/026* (2013.01)
(58) Field of Classification Search
 CPC ... F16K 15/182; F16K 15/1826; F15B 13/027
 See application file for complete search history.

(56) References Cited

U.S. PATENT DOCUMENTS

| | | | | |
|---|---|---|---|---|
| 3,631,888 A | * | 1/1972 | Anton | F15B 13/015 251/63.4 |
| 10,480,542 B2 | * | 11/2019 | Bell | F15B 15/202 |
| 2004/0112208 A1 | * | 6/2004 | Kot, II | F15B 13/01 91/420 |

FOREIGN PATENT DOCUMENTS

JP    2018-9662 A    1/2018

OTHER PUBLICATIONS

Machine translation of JP 2018009662.*

* cited by examiner

*Primary Examiner* — Kevin F Murphy
(74) *Attorney, Agent, or Firm* — Oblon, McClelland, Maier & Neustadt, L.L.P.

(57) ABSTRACT

[Solution] A pilot check valve includes a first body that has input and output ports, a main path 13 that is in communication these ports, and a check valve element that allows a flow of a pressure fluid from the input port toward the output port. The valve element blocks or allows a flow toward the input port side by supply or discharge of a pilot fluid and has a residual pressure exhaust path connected between the main path and an exhaust hole, a seal member that is provided in the exhaust path, and a push rod that moves the check valve element to a position where a flow of a pressure fluid toward the input port side in the main path is allowed and moves the seal member to a position where a flow toward the exhaust hole is allowed.

10 Claims, 9 Drawing Sheets

PILOT CHECK VALVE

TECHNICAL FIELD

The present invention relates to a pilot check valve having a residual pressure exhaust function that discharges residual pressure in a fluid pressure device such as a fluid pressure cylinder.

BACKGROUND ART

A pilot check valve according to the related art has been known as described in Patent Literature 1. The pilot check valve includes an input port for connecting to a pressure fluid source, an output port for connecting to a fluid pressure device such as a fluid pressure cylinder, a main path that connects the input port to the output port, and a check valve element that is provided in the main path, allows a flow of a fluid from the input port toward the output port, and can be selectively moved, by supply or discharge of pilot air, between a first position where a flow from the output port toward the input port is blocked and a second position where the flow is allowed.

Here, the pilot check valve described in Patent Literature 1 is provided with a residual pressure exhaust unit that can exhaust a pressure fluid (residual pressure) sealed in the fluid pressure device from an exhaust hole to the outside through a residual pressure exhaust path where necessary, when the fluid pressure device stops by any cause. The residual pressure exhaust unit has a valve element that is opened/closed by supply or discharge of pilot air. When pressure of the pilot air is applied, the valve element blocks a flow of a pressure fluid from the output port toward the exhaust hole through the residual pressure exhaust path.

However, in a pilot check valve with a residual pressure exhaust valve according to the related art as described above, since the residual pressure exhaust path is connected to the main path downstream of the check valve element on the output port side, if a failure occurs in the sealing property by the valve element in the residual pressure exhaust unit, in case of an emergency such as stopping of power supply, the pressure fluid that is supposed to be sealed in the fluid pressure device may be exhausted to the outside from the exhaust hole through the residual pressure exhaust path. In such a case, the check function of the check valve element provided in the main path may be lost.

CITATION LIST

Patent Literature

[PTL 1]: Japanese Unexamined Patent Application Publication No. 2018-9662

SUMMARY OF INVENTION

Technical Problem

A technical issue of the present invention is to provide a pilot check valve that is capable of holding there a pressure fluid sealed downstream of a check valve element by a check function of the check valve element in case of an emergency such as stopping of power supply, even if a failure occurs in the sealing property by a valve element in a residual pressure exhaust unit.

Solution to Problem

The present invention provides a pilot check valve including a first body that has an input port and an output port, a main path that is provided in the first body and is in communication with the input port and the output port, a check valve element that is provided in the main path and allows a flow of a pressure fluid from a first side in communication with the input port toward a second side in communication with the output port, the check valve element being selectively moved, by supply or discharge of a pilot fluid, to a position where a flow from the output port toward the input port is blocked and a position where the flow is allowed, a residual pressure exhaust path having one end connected to a connecting portion formed on the first side of the main path and another end connected to an exhaust hole provided and opened on the first body, a seal portion that is provided in the residual pressure exhaust path and blocks a flow of a pressure fluid from the connecting portion of the main path toward a side of the exhaust hole, and an operation unit that is capable of moving the check valve element to a position where a flow of a pressure fluid from the second side toward the first side in the main path is allowed and moving the seal portion to a position where the flow of a pressure fluid from the connecting portion of the main path in the residual pressure exhaust path toward the exhaust hole is allowed.

In this case, it is preferable that the first body extends in an axial direction, is formed into a cylindrical shape, and has a base end and a leading end at both ends in the axial direction, the first body has a through-hole that extends inside in the axial direction, the first body has a first opening portion that opens in a middle portion of the first body in the axial direction and that is in communication with the input port, and a second opening portion that opens in a base end portion of the first body in the axial direction and that is in communication with the output port, the check valve element is supported and is movable in the axial direction in a base end portion in the axial direction of the through-hole extending in the axial direction, and the operation unit is accommodated in the through-hole further toward a leading end side than the check valve element in the axial direction and is movable in the axial direction.

In addition, it is preferable that the operation unit is a rod member that extends along the through-hole, the rod member has an outer diameter that is smaller than an inner diameter of the through-hole, and the residual pressure exhaust path is formed of a gap formed between an outer peripheral surface of the rod member and an inner peripheral surface of the through-hole.

In addition, it is preferable that the seal portion has a recessed groove that is formed into an annular shape on the outer peripheral surface of the rod member, and a seal member that is accommodated in the recessed groove, and the seal member is a lip-type seal member, the seal member having a lip portion that is formed to be inclined outward in a radial direction toward a base end side in the axial direction.

In addition, it is preferable that a part of the through-hole in communication with the first opening portion and the second opening portion forms a part of the main path, the base end portion in the axial direction of the through-hole extending in the axial direction has a valve seat on which the check valve element is capable of abutting, and the check valve element is capable of moving to a check position where the check valve element abuts on the valve seat and blocks a flow of a pressure fluid from the output port toward the input port, and to a first releasing position where the check valve element moves from the valve seat toward a base end side in the axial direction and allows the flow.

In addition, it is preferable that the rod member is capable of moving in the axial direction inside the through-hole by receiving a force toward a side of the check valve element, when the seal member is moved to a residual pressure exhaust position in the connecting portion, the flow of a pressure fluid from the connecting portion of the main path toward the exhaust hole is allowed, when the check valve element is moved to a second releasing position further toward a base end side in the axial direction than the first releasing position, the flow of a pressure fluid from the second side toward the first side in the main path is allowed, the rod member is capable of moving the seal member to the residual pressure exhaust position by moving in the axial direction, and capable of moving the check valve element to the second releasing position.

In addition, it is preferable that the check valve element is provided with a first return spring that biases the check valve element toward a side of the valve seat, and the rod member is provided with a second return spring that biases the rod member toward a base end side in the axial direction.

In addition, it is preferable that the through-hole has an exhaust valve chamber on a leading end side in the axial direction, the exhaust valve chamber is provided with a piston inside the exhaust valve chamber, the piston dividing the exhaust valve chamber into a pressure chamber and a discharge chamber and being capable of sliding inside the through-hole, and the first body has a pilot port that introduces pilot pressure into the pressure chamber, and the exhaust hole that is located between the seal member and the piston and is in communication with the discharge chamber and an outside.

In addition, it is preferable that the rod member further has a piston rod that is disposed on a leading end side in the axial direction of the rod member and that is provided to be movable along the through-hole, the piston rod has a base end portion in the axial direction inserted and movable in the axial direction with respect to the piston, and when the piston rod is pressed from a third opening portion that opens at the leading end in the axial direction of the first body toward a base end side in the axial direction, the piston rod is capable of pressing the rod member to move the rod member to the base end side in the axial direction and moving the seal member to the residual pressure exhaust position and capable of moving the check valve element to the second releasing position.

In addition, it is preferable that when the axial direction is an X-axis direction, a direction orthogonal to the X-axis direction is a Z-axis direction, and a direction orthogonal to the X-axis direction and the Z-axis direction is a Y-axis direction, the first body extends in the X-axis direction, the first body is connected, on a base end side in the X-axis direction, to a second body that extends in the Z-axis direction orthogonal to the X-axis direction and that includes the output port at one end, the first body is connected, in a leading end portion in the X-axis direction, to a pilot body that is fitted around an outer periphery of the first body to be rotatable around the X-direction with respect to the first body, the first body is connected to a connecting pipe portion that is fitted around an outer periphery of the first body and rotatable around the X-axis direction further toward a base end side in the X-axis direction than the pilot body, the connecting pipe portion is connected to an annular body that is coupled and rotatable in the Y-axis direction orthogonal to the X-axis direction and the Z-axis direction, and the second body is connected to a cylindrical coupling portion that is fitted to an outer periphery of the second body and rotatable in the Z-axis direction and couples a base end portion of the first body to the second body.

Advantageous Effects of Invention

According to the present invention, it is possible to provide a pilot check valve that is capable of holding there a pressure fluid sealed downstream of a check valve element by a check function of the check valve element in case of an emergency such as stopping of power supply, even if a failure occurs in the sealing property by a valve element in a residual pressure exhaust unit.

DESCRIPTION OF EMBODIMENTS

Hereinafter, a pilot check valve according to the present invention will be described. In the present embodiment, a pilot check valve including three ports of an input port, an output port, and a pilot port and capable of holding residual pressure in a fluid pressure cylinder will be described. Here, a case in which a pressure fluid flowing through the pilot check valve is compressed air will be described.

FIGS. 1 to 6 illustrate an embodiment of the pilot check valve according to the present invention. A pilot check valve 10 has an input port 11 that is connected to solenoid switching valves 72 and 75 (see FIG. 7), an output port 12 that is connected to a fluid pressure device such as a fluid pressure cylinder 80 (see FIG. 7), a main path 13 that connects the input port 11 and the output port 12, a check valve element 14 that is provided in the middle of the main path 13 and allows a flow of a pressure fluid from a first side in communication with the input port 11 toward a second side in communication with the output port 12, a residual pressure exhaust path 15 that is provided further toward the input port 11 side than the check valve element 14, a seal member 48 that is provided on the residual pressure exhaust path 15 so as to be movable and that blocks a flow from the output port 12 side toward the residual pressure exhaust path 15 side, and a pilot port 55 that introduces a pilot fluid.

Figure 1:
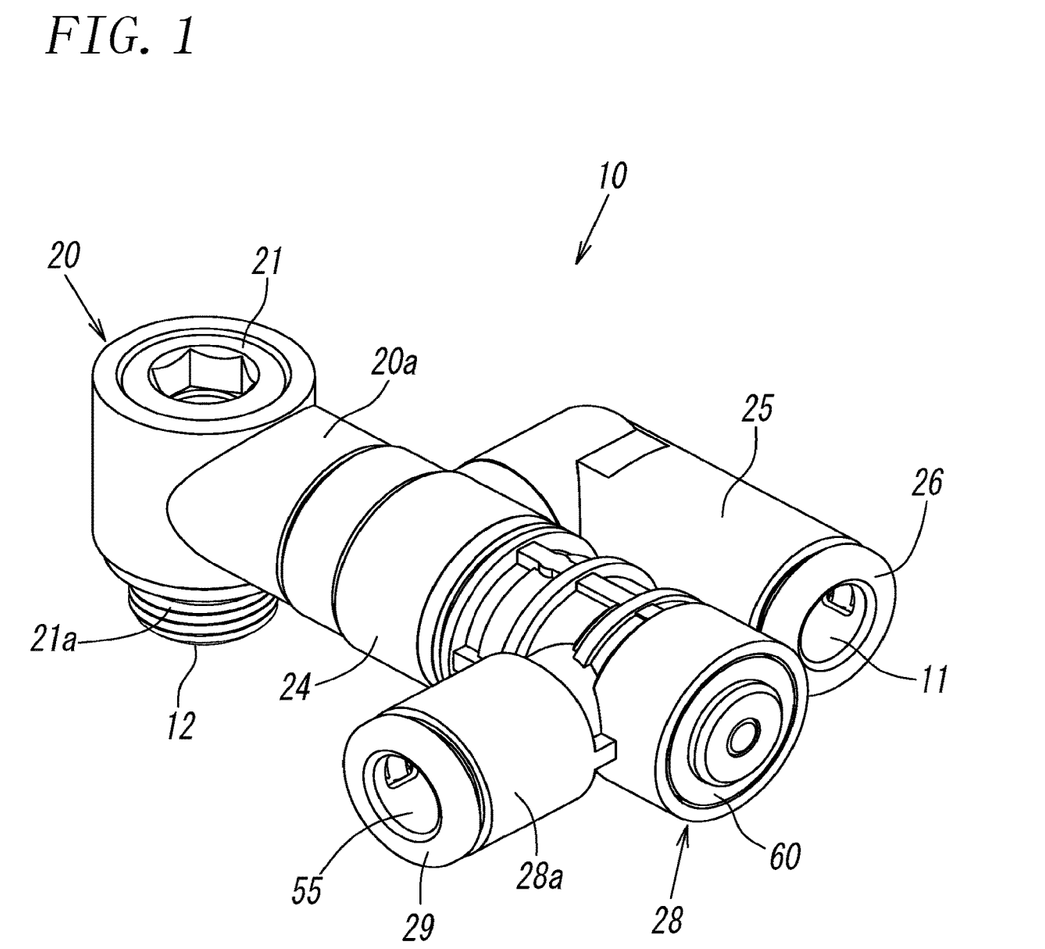
FIG. 1 is a perspective view of a pilot check valve according to an embodiment of the present invention.
Figure 2:
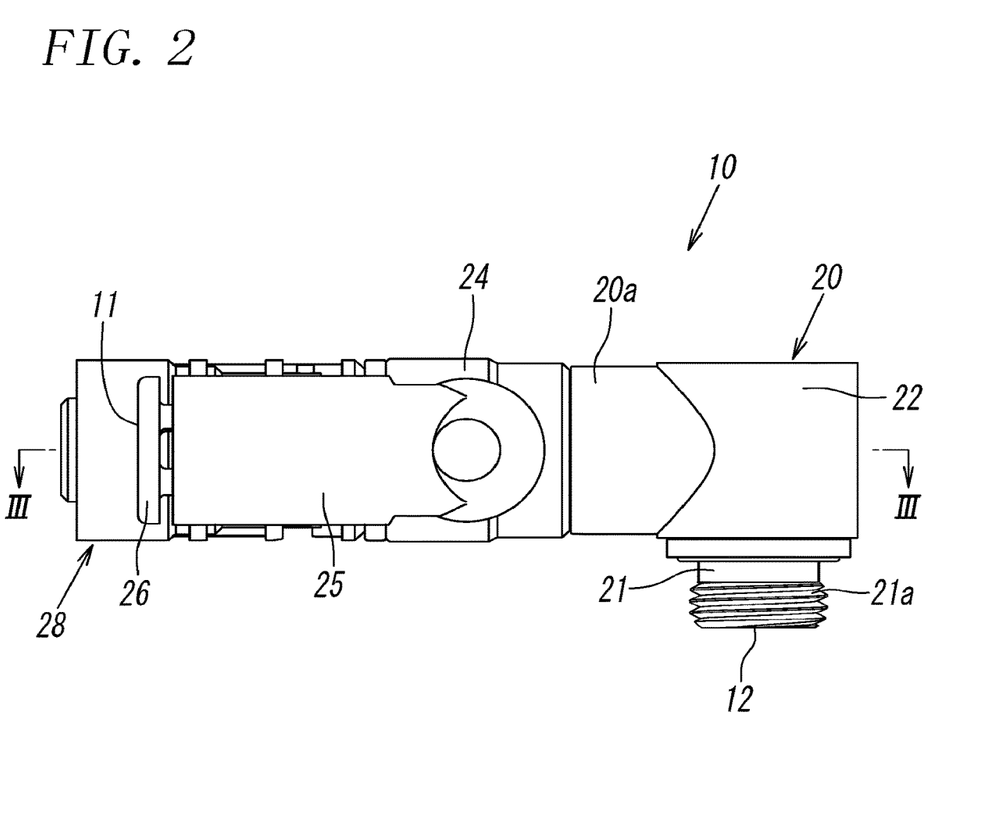
FIG. 2 is a side view of the pilot check valve.
Figure 3:
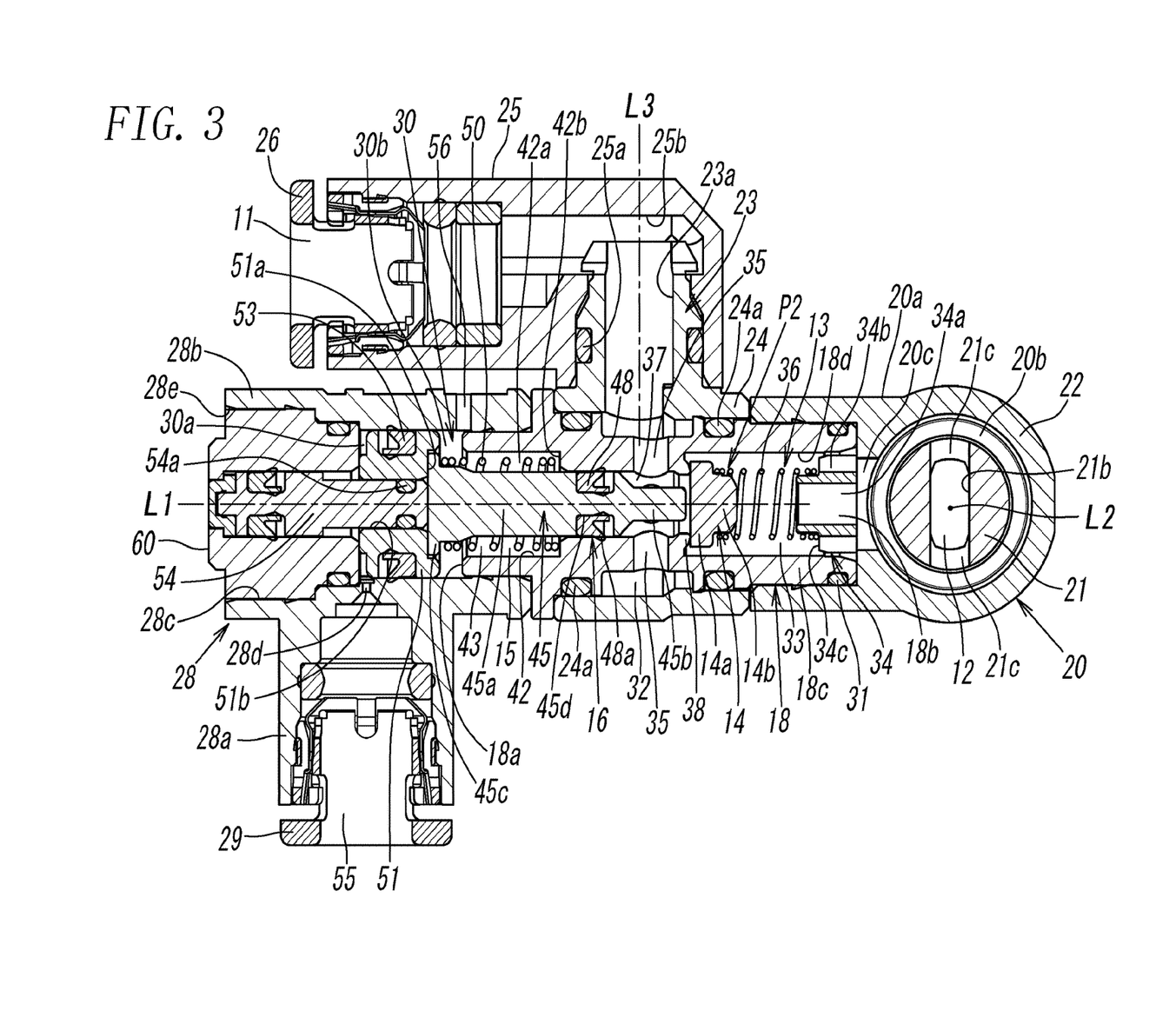
FIG. 3 is a sectional view of the pilot check valve along line III-III of FIG. 2.

The output port 12 is provided at a base end 18b in a direction of an axis L1 of a body 18 having a substantially cylindrical shape elongated along the first axis L1. The body 18 is provided with an attachment portion 24 that is fitted to an outer periphery of the body 18 so as to be rotatable around the axis L1. The attachment portion 24 is provided with a connecting pipe portion 23 that projects in a direction of a third axis L3 orthogonal to the first axis L1 and a second axis L2 described later. The connecting pipe portion 23 is provided with an annular body 25 that is coupled so as to be rotatable around the axis L3, and the input port 11 is provided in a leading end portion in an extending direction of the annular body 25. Details of the attachment portion 24, the connecting pipe portion 23, and the annular body 25 will be described later.

In addition, a check valve body 20 that has a substantially cylindrical shape and extends along the second axis L2 orthogonal to the first axis L1 is attached to a base end portion of the body 18. The output port 12 opens in one end portion (lower end portion) in a direction of the axis L2 of a main body 21 (second body) provided inside the check valve body 20.

In addition, in a middle portion of the body 18 in the direction of the axis L1, the connecting pipe portion 23 that is fitted to an outer periphery of the body 18 is provided. The connecting pipe portion 23 is formed into a cylindrical shape that projects from a side surface of the body 18 and extends along the third axis L3 orthogonal to the first and second axes L1 and L2. The annular body 25 is attached to the connecting pipe portion 23, and the input port 11 is provided in a port block 26 that is connected to one end portion of the annular body 25.

The body 18 has a pilot body 28 having a substantially cylindrical shape, fitted to an outer periphery of a leading end 18*a* of the body 18, and extending along the first axis L1. The pilot port 55 is provided in a port block 29 connected to a port forming portion 28*a* formed in the pilot body 28 and having a cylindrical shape.

The main path 13 is formed so as to reach from the input port 11 to the output port 12 of the main body 21 through the annular body 25, the connecting pipe portion 23, the inside of the body 18, and the check valve body 20. The body 18, the check valve body 20, the connecting pipe portion 23, the annular body 25, and the pilot body 28 can be formed with a metal material such as an aluminum alloy, a synthetic resin material, or the like.

Hereinafter, a configuration of the pilot check valve 10 will be described in further detail. First, the connecting pipe portion 23 has the attachment portion 24 having a cylindrical shape formed in a base end portion in the direction of the axis L3 of the connecting pipe portion 23. The attachment portion 24 is fitted to an outer peripheral surface of the body 18 via two O-rings 24*a* on an inner surface of the attachment portion 24 so that the attachment portion 24 and the body 18 are airtightly attached to each other.

The annular body 25 forms an elbow shape and is attached airtightly to the connecting pipe portion 23 provided on a side surface of the body 18 via an O-ring 25*a* so as to be rotatable in forward and reverse directions around the center axis (the third axis L3) of the connecting pipe portion 23. The input port 11 is formed in the port block 26 attached to a leading end of the annular body 25. In addition, a second path hole 25*b* in the annular body 25 is in communication with a connecting hole 23*a* in the connecting pipe portion 23. The center axis of the connecting pipe portion 23, that is, the third axis L3 is orthogonal to both of the first axis L1 and the second axis L2, and the input port 11 opens in a direction orthogonal to the third axis L3.

As an insertion portion 18*c* at a base end of the body 18 is inserted, via a seal member 31, from an opening end portion side of the connecting portion 20*a* that opens on a side surface of the check valve body 20, the body 18 is airtightly attached in a state of closing an opening end portion of the check valve body 20. The body 18 has a through-hole 18*d* extending in the direction of the axis L1 in the body 18.

The check valve body 20 has the main body 21 having a cylindrical shape whose center axis is the second axis L2 and a cylindrical coupling portion 22 fitted to an outer periphery of the main body 21. The cylindrical coupling portion 22 is fitted to the main body 21 via an O-ring (not illustrated) on an inner surface of the cylindrical coupling portion 22 so as to be rotatable with respect to the main body 21, as a result of which the cylindrical coupling portion 22 is coupled to the main body 21 so as to be rotatable in both forward and reverse directions around the second axis L2. Therefore, the body 18, the annular body 25, the pilot body 28, and the like are rotatable around the second axis L2 with respect to the main body 21.

In the main body 21, at a position of one end portion (lower end portion) of the second axis L2 of the main body 21, a connecting portion 21*a* that is directly fitted and connected to an attachment hole of a fluid pressure device is formed, the output port 12 is formed inside the connecting portion 21*a*, and a recess and a projection are provided on an outer periphery of the connecting portion 21*a*. Note that the connecting portion 21*a* may be a male screw, and may also be configured to be connected to the fluid pressure device via a pipe. In addition, in the main body 21, a second flow hole 21*b* extending in the direction of the axis L2 from the output port 12 is formed, and a plurality of branch holes 21*c* in communication with the second flow hole 21*b* and extending in a radial direction is also formed. The plurality of branch holes 21*c* is in communication with a second annular path 20*b* formed between an inner periphery of the cylindrical coupling portion 22 and an outer periphery of the main body 21, the second annular path 20*b* is in communication with a third communication hole 20*c* formed in the cylindrical coupling portion 22 of the check valve body 20.

In the insertion portion 18*c*, a check valve chamber 33 that is a part of the through-hole 18*d* and extends in the direction of the axis L1 is formed. The check valve chamber 33 is in communication with the third communication hole 20*c* of the check valve body 20. A spring support portion 34 is inserted and attached to a base end portion of the check valve chamber 33 in the direction of the axis L1. The spring support portion 34 is formed into a columnar shape, a communication hole 34*a* (second opening portion) that passes through the spring support portion 34 in the direction of the axis L1 is formed inside the spring support portion 34, and a plurality of cut-away holes 34*b* provided at an interval in a circumferential direction is formed on an outer peripheral portion of the spring support portion 34. In addition, in a base end portion of the spring support portion 34 in the direction of the axis L1, a step portion 34*c* projecting outward in a radial direction and annularly extending is formed, and one end portion of a first return spring 36 abuts on the step portion 34*c* and is locked.

A first annular path 32 (first opening portion) that surrounds the body 18 is formed between an inner peripheral surface of the attachment portion 24 of the connecting pipe portion 23 attached to the body 18 and the outer peripheral surface of the body 18. The first annular path 32 is in communication with the connecting hole 23*a* of the connecting pipe portion 23 and is also in communication with a plurality of first communication holes 35 extending in a radial direction in the body 18. The first communication holes 35 are in communication with the check valve chamber 33 adjacent to a central hole 37 through the central hole 37 (connecting portion) formed in a central portion of the body 18 and extending in the direction of the axis L1. The central hole 37 forms a part of the through-hole 18$d$. A valve seat 38 having an annular shape and surrounding the central hole 37 is formed on a boundary between the check valve chamber 33 and the central hole 37.

In the check valve chamber 33, the check valve element 14 is supported by the first return spring 36 attached between the check valve element 14 and the spring support portion 34, and thus the check valve element 14 is provided so as to be displaceable in the direction of the axis L1. The check valve element 14 is formed having a valve plate portion 14$a$ having a disk shape and a projection portion 14$b$ projecting from a leading end of the valve plate portion 14$a$ in the direction of the axis L2. One end portion of the first return spring 36 is locked to the spring support portion 34, and another end portion of the first return spring 36 is locked to the projection portion 14$b$. The check valve element 14 opens and closes the main path 13 connecting the input port 11 and the output port 12 as the valve plate portion 14$a$ comes into contact with and is separated from the valve seat 38. By the first return spring 36, the check valve element 14 is always biased toward a check position (see FIG. 3) where the check valve element 14 is seated on the valve seat 38.

With respect to a flow in a forward direction of a pressure fluid from the input port 11 toward the output port 12 side through the main path 13, the check valve element 14 is pushed by this flow, moves to a first releasing position P1 (see FIG. 5) where the check valve element 14 is separated from the valve seat 38 while compressing the first return spring 36, and releases the main path 13 to allow the flow of the pressure fluid in the forward direction. On the other hand, with respect to a flow in a reverse direction, which is a flow from the output port 12 toward the input port 11 side, the check valve element 14 is pushed by this flow and a biasing force of the first return spring 36, moves to a check position P2 (see FIG. 3) where the check valve element 14 is seated on the valve seat 38, and closes the main path 13 to block the flow of the pressure fluid in the reverse direction. That is, the state of the check valve element 14 described above is a state of "function turned on" in which the check valve element 14 can exhibit its original check function.

In the body 18, a residual pressure exhaust valve hole 42 that is a part of the through-hole 18$d$, is in communication with the central hole 37, and extends toward a base end side in the direction of the axis L1 is formed, and in the residual pressure exhaust valve hole 42, a push rod 45 (operation unit) is accommodated so as to be slidable in the direction of the axis L1. A gap 43 through which air can pass is formed between an outer surface of the push rod 45 and an inner surface of the residual pressure exhaust valve hole 42, and the gap 43 forms a residual pressure exhaust path 15 extending in the direction of the axis L1. The residual pressure exhaust path 15 is in communication with the central hole 37. That is, the residual pressure exhaust path 15 extends from the central hole 37 to the leading end side in the direction of the axis L1.

The push rod 45 has a rod portion 45$a$ and a pressing portion 45$b$ having a small-diameter shaft shape and extending from a base end in the direction of the axis L1 of the rod portion 45$a$, and a leading end of the pressing portion 45$b$ faces the check valve element 14 in the central hole 37. A ring groove 45$d$ (seal portion) is formed into an annular shape in a leading end portion of the rod portion 45$a$, and a seal member 48 (seal portion) is accommodated in the ring groove 45$d$.

The seal member 48 is formed into an annular shape and has a lip portion 48$a$ that is inclined outward in a radial direction toward the leading end side in the direction of the axis L1. A leading end portion of the lip portion 48$a$ is pressed against an inner surface of the residual pressure exhaust valve hole 42, closes the residual pressure exhaust path 15, and blocks a flow of a pressure fluid from the leading end side to the base end side in the direction of the axis L1. That is, in a state where the seal member 48 is pressed against the inner surface of the residual pressure exhaust valve hole 42, the residual pressure exhaust path 15 is blocked. When the seal member 48 is displaced as the push rod 45 moves toward the base end side in the axis direction and the seal member 48 moves to a residual pressure exhaust position P3 where the central hole 37 is located, the lip portion 48$a$ is separated from a base end in the axis direction of the residual pressure exhaust valve hole 42 and opens the residual pressure exhaust path 15. At the same time, the lip portion 48$a$ is accommodated in the central hole 37 in a state where a flow of the pressure fluid is possible without closing the central hole 37 (see FIG. 5).

A flange portion 45$c$ projecting outward in a radial direction and having an annular shape is formed in a leading end portion in the direction of the axis L1 of the rod portion 45$a$ of the push rod 45. In addition, a spring accommodating groove 42$a$ having an inner diameter larger than the outer diameter of the rod portion 45$a$ is formed on a leading end side in the direction of the axis L1 of the residual pressure exhaust valve hole 42, and a step portion 42$b$ extending in a radial direction and having an annular shape is formed at a base end in the direction of the axis L1 of the spring accommodating groove 42$a$. In addition, a second return spring 50, which is a compression coil spring, is provided between the flange portion 45$c$ and the step portion 42$b$ of the spring accommodating groove 42$a$ in a state where the rod portion 45$a$ is inserted into the second return spring 50 and the second return spring 50 is accommodated in the spring accommodating groove 42$a$. By the second return spring 50, the push rod 45 is always biased toward the leading end side in the direction of the axis L1. Note that an outer diameter of the flange portion 45$c$ is slightly smaller than an inner diameter of the spring accommodating groove 42$a$. Accordingly, the flange portion 45$c$ can move inside the spring accommodating groove 42$a$ in the direction of the axis L1.

The pilot body 28 attached to a leading end portion of the body 18 has an attachment portion 28$b$ having a cylindrical shape and attached to an outer peripheral surface of a base end portion of the body 18, and a port forming portion 28$a$ having an annular shape and projecting from a side surface of the attachment portion 28$b$. By fitting a locking step portion having an annular shape formed in the leading end portion of the body 18 into a recessed groove annularly shaped on an inner peripheral surface of the attachment portion 28$b$, the pilot body 28 is attached so as to be prevented from coming off the body 18 and rotatable around the axis L1.

In the inner peripheral surface of the attachment portion 28$b$, a residual pressure exhaust communication hole 28$c$ in communication with the residual pressure exhaust valve hole 42 is formed in the direction of the axis L1. An inner diameter of the residual pressure exhaust communication hole 28$c$ is larger than that of the residual pressure exhaust valve hole 42, and an exhaust valve chamber 30 is formed inside the residual pressure exhaust communication hole 28c. In the exhaust valve chamber 30, a piston 51 that divides the exhaust valve chamber 30 into a pressure chamber 30a and an exhaust chamber 30b and that is capable of sliding in the direction of the axis L1 inside the residual pressure exhaust communication hole 28c is provided. A gap through which air can pass is formed between an outer surface of the piston 51 on an outer side in a radial direction and an inner surface of the residual pressure exhaust communication hole 28c. The gap forms the residual pressure exhaust path 15 (see FIG. 5) extending in the direction of the axis L1. The residual pressure exhaust path 15 is in communication with the pressure chamber 30a and the exhaust chamber 30b.

A recessed groove having an annular shape extending in a circumferential direction is formed on an outer peripheral surface of the piston 51, and a seal member 53 that seals a space between the outer peripheral surface of the piston 51 and an inner peripheral surface of the residual pressure exhaust communication hole 28C is attached inside the recessed groove. The seal member 53 has a lip-type structure similar to the seal member 48 described above, but differs in the direction of the lip portion 48a. A lip portion 53a of the seal member 53 is inclined outward in a radial direction toward the leading end side in the direction of the axis L1. As a result, the lip portion 53a allows a flow of a pressure fluid from the base end side toward the leading end side in the direction of the axis L1 while blocking a flow of a pressure fluid from the leading end side to the base end side in the direction of the axis L1.

Figure 4:
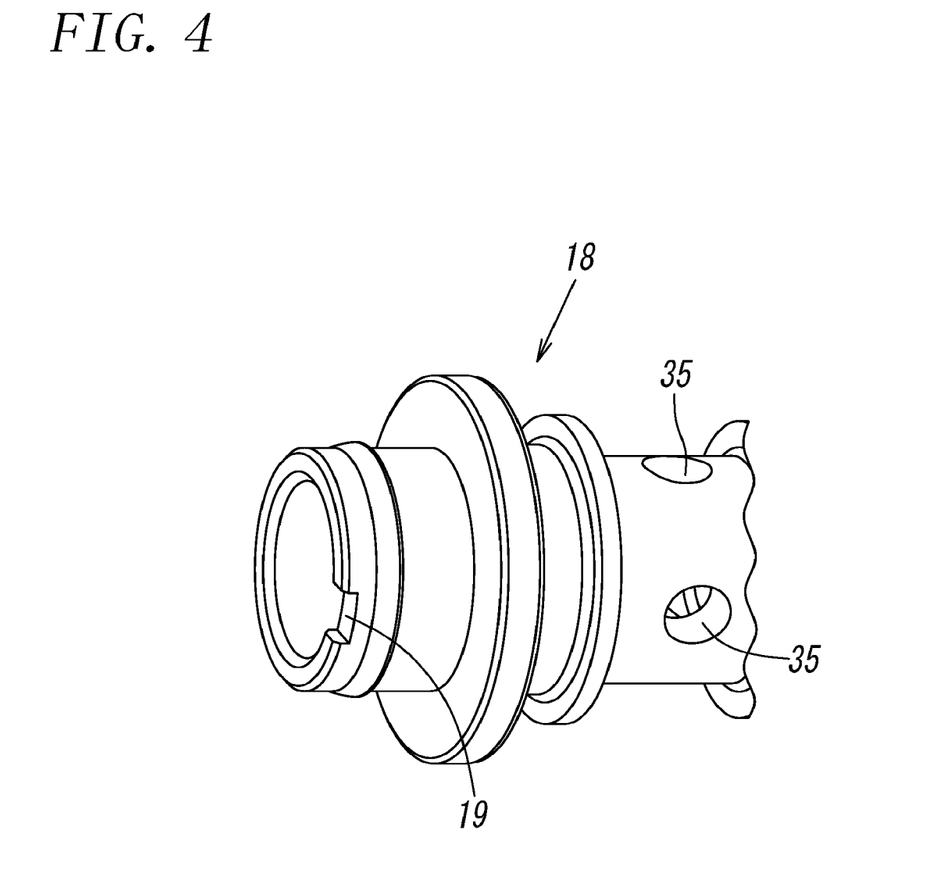
FIG. 4 is a partial perspective view of a check valve main body.

A recessed groove 51a that is recessed toward the leading end side is formed in a base end portion of the piston 51, and the flange portion 45c of the push rod 45 is accommodated in the recessed groove 51a in a state of abutting on the recessed groove 51a. The depth of the recessed groove 51a is substantially the same as the thickness of the flange portion 45c. A base end surface of the piston 51 is formed into an annular shape around the axis L1 and extends in a direction orthogonal to the direction of the axis L1. When the base end surface of the piston 51 abuts on a leading end surface of the body 18, these surfaces abut on each other so that a space therebetween becomes airtight, thereby blocking the residual pressure exhaust path 15. Therefore, a cut-away hole 19 illustrated in FIG. 4 is provided in the leading end portion of the body 18. With the cut-away hole 19, the residual pressure exhaust path 15 can be brought into a communication state even when the base end surface of the piston 51 abuts on the leading end surface of the body 18.

In a central portion of the piston 51, a through-hole 51b that passes through the piston 51 in the direction of the axis L1 is provided. By fitting a base end portion of the piston rod 54 into the through-hole 51b via an O-ring 54a attached to the base end portion of the piston rod 54 in the direction of the axis L1, the piston rod 54 is airtightly attached to the through-hole 51b of the piston 51. Note that the piston rod 54 is fitted to the through-hole 51b of the piston 51 so as to be slidable in the direction of the axis L1 (see FIG. 5).

A cover member 60 having a cylindrical shape is attached to the residual pressure exhaust communication hole 28c on a leading end side of the attachment portion 28b. The cover member 60 is inserted from an opening portion 28e (third opening portion) that opens at a leading end of the residual pressure exhaust communication hole 28c in the axis direction and is fitted to the residual pressure exhaust communication hole 28c via an O-ring 61 attached to a base end portion in the direction of the axis L1 of the cover member 60, as a result of which the cover member 60 is airtightly attached to the residual pressure exhaust communication hole 28c. In addition, a plurality of step portions is formed on an outer peripheral surface of the cover member 60. As the step portions are caused to abut on engagement steps formed on an inner surface of the residual pressure exhaust communication hole 28c, the cover member 60 is attached to the attachment portion 28b in a state where the position of the cover member 60 is determined in the direction of the axis L1. Moreover, as locking projections formed on the outer peripheral surface of the cover member 60 are caused to be engaged with engagement recessed portions formed on the inner surface of the residual pressure exhaust communication hole 28c, the cover member 60 is attached to the attachment portion 28b in a state where the cover member 60 can be prevented from coming off.

The port forming portion 28a formed on a side surface of the attachment portion 28b is formed into a cylindrical shape extending in a direction orthogonal to the axis L1, and the pilot port 55 is formed in the port block 29 inserted into an opening portion on one end side of the port forming portion 28a. A communication hole 28d is formed in a bottom portion of the port forming portion 28a, and the communication hole 28d is in communication with the pressure chamber 30a. The communication hole 28d is an orifice whose cross-sectional area is decreased, and pilot pressure to be introduced into the pressure chamber 30a can be increased.

In addition, an exhaust hole 56 in communication with the exhaust chamber 30b is formed in the attachment portion 28b. The exhaust hole 56 discharges air in the exhaust chamber 30b to the outside as the piston 51 moves toward the leading end side in the direction of the axis L1, and at the same time, the exhaust hole 56 can discharge residual pressure in a fluid pressure cylinder 80 (see FIG. 7), as will be described in detail later.

In the pilot check valve 10 configured as described above, when a pilot fluid is introduced from the pilot port 55 to the pressure chamber 30a, the piston 51 is pressed toward the base end side in the direction of the axis L1, the push rod 45 is moved toward the base end side against the bias of the second return spring 50, and in addition, a leading end portion of the push rod 45 abuts on the check valve element 14, and the valve element 14 is moved toward the base end side in the direction of the axis L1 against the bias of the first return spring 36. Note that in this state, the seal member 48 is located further toward the base end side in the direction of the axis L1 than the central hole 37 and closes the residual pressure exhaust path 15. Accordingly, since the check valve element 14 is separated from the valve seat 38 and releases the main path 13, a flow of a pressure fluid from the input port 11 toward the output port 12 side is allowed.

Next, a fluid pressure circuit in a case where a fluid pressure device (the fluid pressure cylinder 80) is controlled using the pilot check valve 10 will be described.

Figure 7:
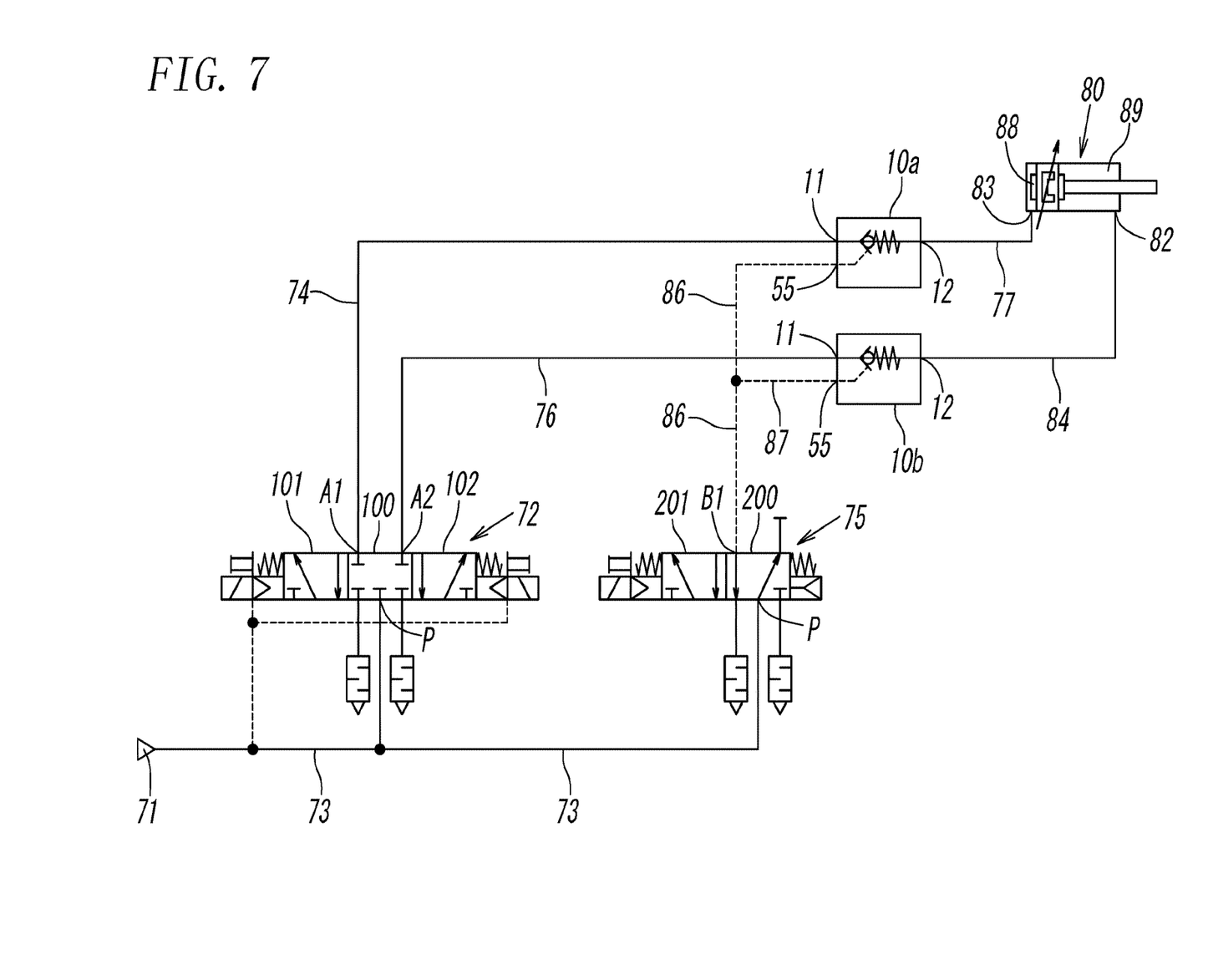
FIG. 7 is a circuit configuration diagram of an air pressure circuit using the pilot check valve and illustrates a state where a pressure fluid is blocked.

FIG. 7 illustrates an example of a fluid pressure circuit in a case where the fluid pressure cylinder 80, which is an example of a fluid pressure device, is controlled. The fluid pressure circuit supplies a pressure fluid discharged from a pressure fluid source 71 to the two solenoid switching valves 72 and 75, and pilot check valves 10a and 10b are connected between the fluid pressure cylinder 80 and the two solenoid switching valves 72 and 75, respectively. The two pilot check valves 10a and 10b have the same configuration. In addition, one of the two solenoid switching valves 72 and 75 is the direction switching solenoid valve 72 that switches an expansion direction of the fluid pressure cylinder 80, and the other is the pilot pressure supply solenoid valve 75 that supplies pilot pressure to the pilot check valves 10a and 10b. The direction switching solenoid valve 72 is a three-position five-port type switching valve. The pilot pressure supply solenoid valve 75 is a two-position five-port type switching valve. The solenoid valves 72 and 75 have a detent function capable of holding switching positions (101, 102, and 201).

Hereinafter, the fluid pressure circuit will be described in further detail. FIGS. 1 to 6 are referred to for specific configurations of the symbolized two pilot check valves 10a and 10b.

As illustrated in FIG. 7, input ports P of the direction switching solenoid valve 72 and the pilot pressure supply solenoid valve 75 are connected to the pressure fluid source 71 through a supply path 73. A first output port A1 of the direction switching solenoid valve 72 is connected to the input port 11 of the first pilot check valve 10a through a first output path 74, and a second output port A2 of the direction switching solenoid valve 72 is connected to the input port 11 of the second pilot check valve 10b through a second output path 76. In addition, the output port 12 of the first pilot check valve 10a is connected to a head-side port 83 of the fluid pressure cylinder 80 through a first communication path 77, and the output port 12 of the second pilot check valve 10b is connected to a rod-side port 82 of the fluid pressure cylinder 80 through a second communication path 84.

Moreover, the pilot port 55 of the first pilot check valve 10a is connected to a first output port B1 of the pilot pressure supply solenoid valve 75 through a first pilot supply path 86, and the pilot port 55 of the second pilot check valve 10b is connected to the first output port B1 through a second pilot supply path 87 and the first pilot supply path 86. The second pilot supply path 87 branches off from the first pilot supply path 86 and is connected to the pilot port 55 of the second pilot check valve 10b.

The fluid pressure circuit illustrated in FIG. 7 indicates a state in which since the pressure fluid source 71 is blocked from the fluid pressure circuit, a pressure fluid is not supplied, the direction switching solenoid valve 72 is located at an initial position that holds a neutral position 100, and the pilot pressure supply solenoid valve 75 is located at an initial position that holds a first switching position 200 where pilot pressure is not supplied. At this time, since pilot fluid is not supplied, the check valve elements 14 of both of the first pilot check valve 10a and the second pilot check valve 10b are in the state of "function turned on" in which the check valve elements 14 can exhibit the check function, and the seal member 48 closes the residual pressure exhaust path 15 (see FIG. 3). Accordingly, since the main path 13 is closed by the check valve elements 14 of the first pilot check valve 10a and the second pilot check valve 10b, pressure fluids in a head-side pressure chamber 88 and a rod-side pressure chamber 89 of the fluid pressure cylinder 80 are sealed as they are.

From the state described above, as illustrated in FIG. 8, when the pressure fluid source 71 is connected to the fluid pressure circuit, and the direction switching solenoid valve 72 is switched to a first switching position 101 after a first solenoid 72a of the direction switching solenoid valve 72 is excited, a pressure fluid from the pressure fluid source 71 is supplied to the input port P of the direction switching solenoid valve 72 through the supply path 73, and, at the same time, is supplied to the input port 11 of the first pilot check valve 10a through the first output path 74.

In addition, when the pressure fluid source 71 is connected to the fluid pressure circuit, and the pilot pressure supply solenoid valve 75 is switched to a second switching position 201 after a first solenoid 75a of the pilot pressure supply solenoid valve 75 is excited, a pressure fluid from the pressure fluid source 71 is supplied to the input port P of the pilot pressure supply solenoid valve 75 through the supply path 73 and is supplied to the pilot port 55 of the first pilot check valve 10a through the first pilot supply path 86. Accordingly, the first pilot check valve 10a enters a state of "function turned off" in which the first pilot check valve 10a introduces a pilot fluid from the pilot port 55 into the pressure chamber 30a, moves the push rod 45 via the piston 51, and opens the main path 13 by the check valve element 14 (see FIG. 5).

As a result, the pressure fluid supplied to the input port 11 of the first pilot check valve 10a is discharged from the output port 12 through the main path 13 of the first pilot check valve 10a and introduced into the head-side pressure chamber 88 of the fluid pressure cylinder 80.

Figure 8:
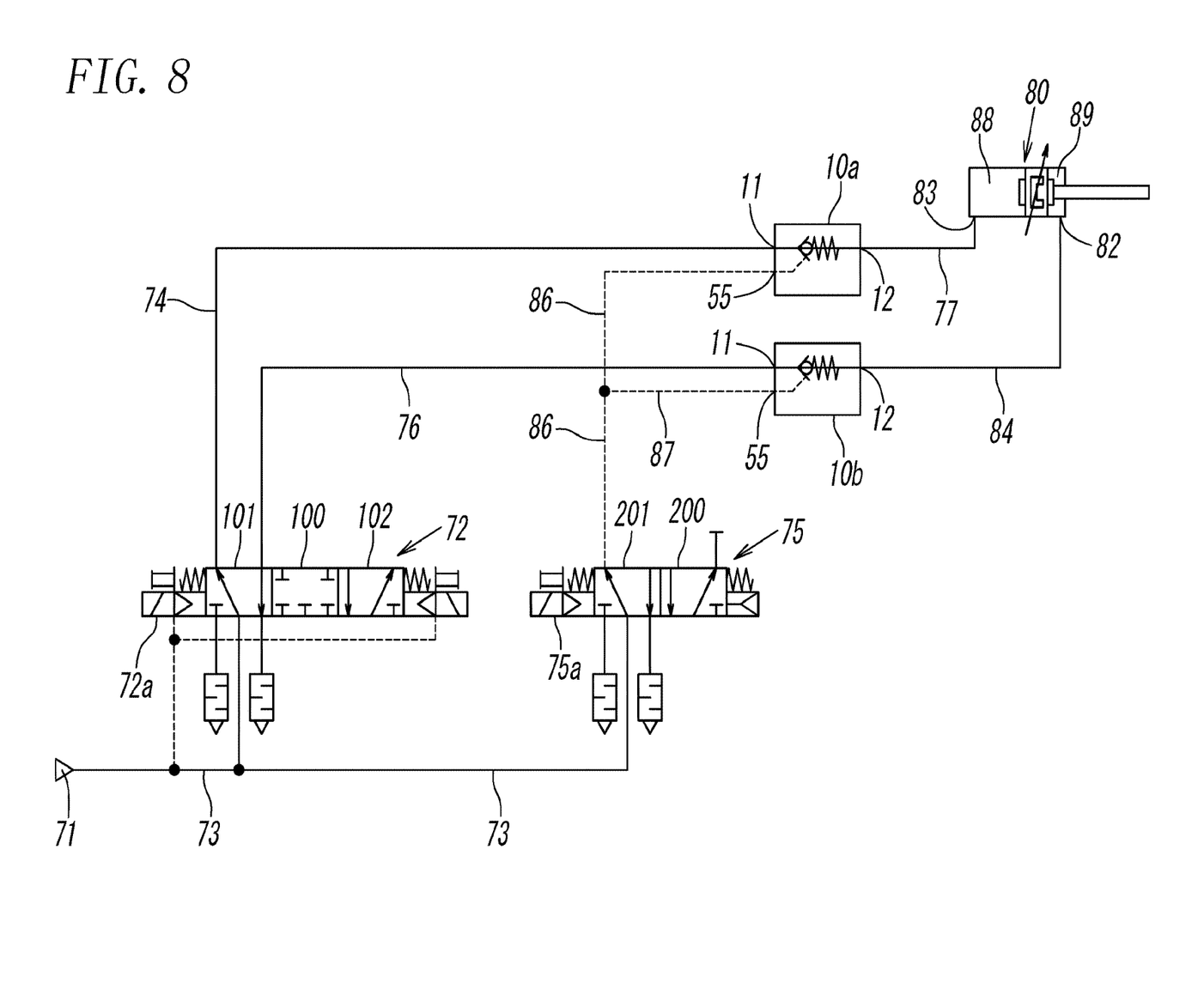
FIG. 8 is a circuit configuration diagram when a pressure fluid is supplied and a fluid pressure cylinder is extended from the state in FIG. 7.

On the other hand, in the second pilot check valve 10b, as a pilot fluid is supplied to the pilot port 55 from the first pilot supply path 86 through the second pilot supply path 87, the second pilot check valve 10b enters the state of "function turned off", and the main path 13 is opened. Accordingly, the pressure fluid in the rod-side pressure chamber 89 of the fluid pressure cylinder 80 is discharged to the outside through the second communication path 84, the output port 12 of the second pilot check valve 10b, the main path 13, the input port 11, the second output path 76, and the direction switching solenoid valve 72. As a result, the fluid pressure cylinder 80 extends as illustrated in FIG. 8.

Next, for holding the extended state of the fluid pressure cylinder 80, as illustrated in FIG. 7, the direction switching solenoid valve 72 is switched to the neutral position 100, and the pilot pressure supply solenoid valve 75 is also switched to the first switching position 200. When the direction switching solenoid valve 72 is switched to the neutral position 100 and the pilot pressure supply solenoid valve 75 is also switched to the first switching position 200, the check valve element 14 of the first pilot check valve 10a is pushed by a pressure fluid that is trying to flow in a reverse direction and a return movement of the first return spring 36 and thus is seated on the valve seat 38, and closes the main path 13 so as to exhibit the check function. Therefore, the pressure fluid in the head-side pressure chamber 88 of the fluid pressure cylinder 80 is sealed in the head-side pressure chamber 88 as it is. In addition, the pressure fluid in the rod-side pressure chamber 89 of the fluid pressure cylinder 80 is also sealed in the rod-side pressure chamber 89 as it is. Therefore, the fluid pressure cylinder 80 is held at the extended position.

Figure 9:
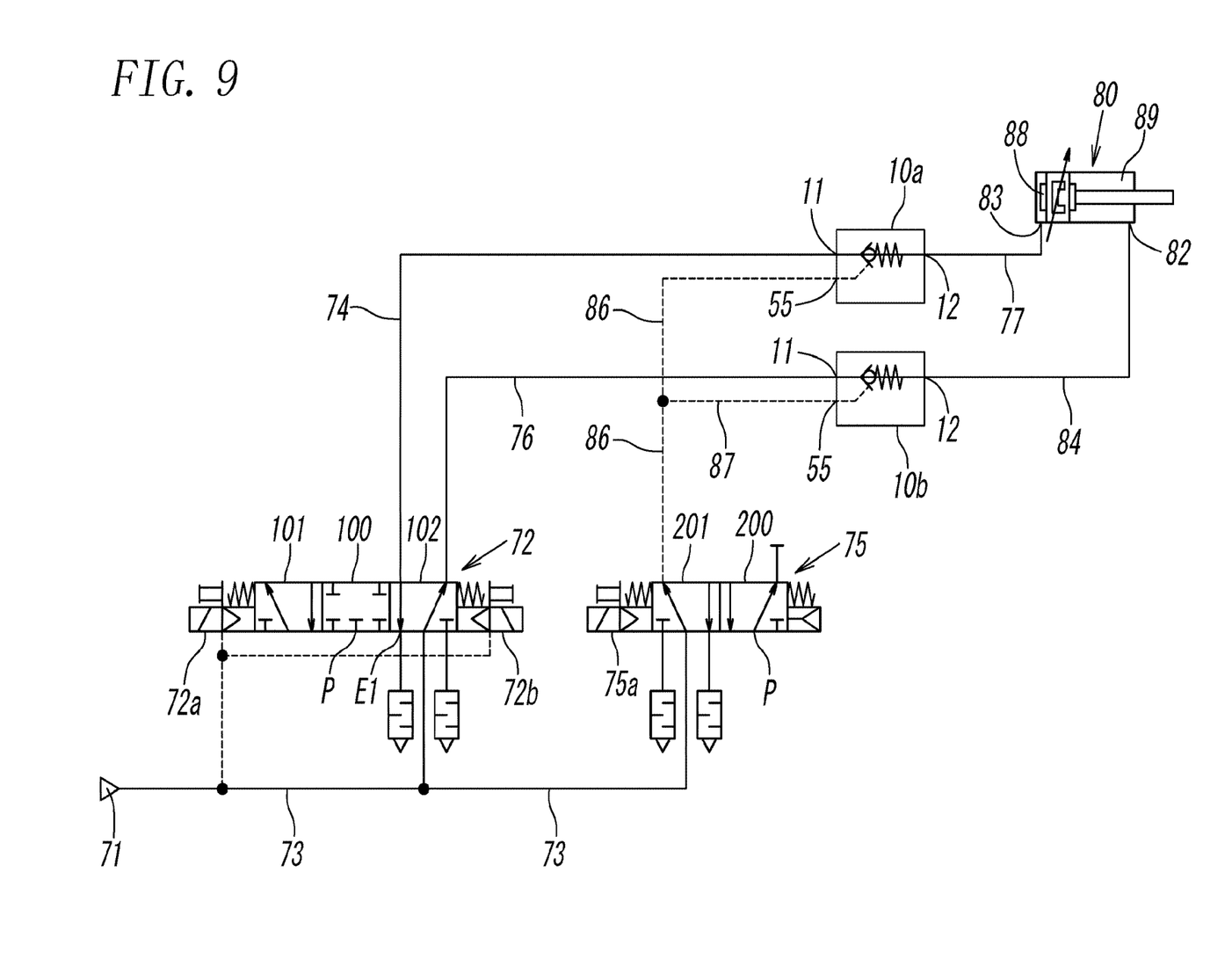
FIG. 9 is a circuit configuration diagram when a pressure fluid is supplied and the fluid pressure cylinder is contracted from the state in FIG. 7.

In addition, for contracting the fluid pressure cylinder 80, as illustrated in FIG. 9, a second solenoid 72b of the direction switching solenoid valve 72 is excited so as to switch the direction switching solenoid valve 72 to the second switching position 102, and the first solenoid 75a of the pilot pressure supply solenoid valve 75 is also excited so as to switch the pilot pressure supply solenoid valve 75 to the second switching position 201. As a result, actions of the first pilot check valve 10a and the second pilot check valve 10b are mutually reversed from the case of extending the fluid pressure cylinder 80, a pressure fluid is supplied from the direction switching solenoid valve 72 to the rod-side pressure chamber 89 of the fluid pressure cylinder 80 through the second pilot check valve 10b, and at the same time, the pressure fluid in the head-side pressure chamber 88 is discharged from the first pilot check valve 10a through a first discharge port E1 of the direction switching solenoid valve 72, and the fluid pressure cylinder 80 is contracted and returns to the initial position.

The above description is an example of a case where the fluid pressure circuit normally operates. However, in an abnormal situation such as a case in which the fluid pressure cylinder 80 is extended as in FIG. 8, power feeding to the direction switching solenoid valve 72 and the pilot pressure supply solenoid valve 75 is interrupted, and a failure occurs in the seal property of the seal member 48 of the first pilot check valve 10*a*, thereby losing the check function, supply of a pilot fluid from the pilot port 55 is stopped, and introduction of a compressed fluid from the input port 11 is also stopped. Therefore, the push rod 45 moves toward the leading end side in the direction of the axis L1 by a return movement of the second return spring 50 and the pressure fluid flowing through the residual pressure exhaust path 15.

As a result, since the push rod 45 is moved toward the leading end side in the direction of the axis L1, the check valve element 14 illustrated in FIG. 3 is pushed by a pressure fluid trying to flow in a reverse direction and a return movement of the first return spring 36 and is seated on the valve seat 38, and enters the state of "function turned on" in which the check valve element 14 closes the main path 13 and exhibits the check function. As a result, the pressure fluid in the head-side pressure chamber 88 of the fluid pressure cylinder 80 can be sealed in the head-side pressure chamber 88 as it is.

On the other hand, since the second pilot check valve 10*b* is also in a state where power feeding is interrupted, no pilot fluid is supplied. Therefore, since the push rod 45 is pressed by a return movement of the second return spring 50 and is moved toward the leading end side in the direction of the axis L1, the check valve element 14 illustrated in FIG. 3 is pushed by a pressure fluid trying to flow in a reverse direction and a return movement of the first return spring 36 and is seated on the valve seat 38, and enters the state of "function turned on" in which the check valve element 14 closes the main path 13 and exhibits the check function. Therefore, the pressure fluid in the rod-side pressure chamber 89 of the fluid pressure cylinder 80 can be sealed in the rod-side pressure chamber 89 as it is.

As a result, since the fluid pressure cylinder 80 is maintained at the extended position, malfunction of the fluid pressure device connected to the fluid pressure cylinder 80 can be prevented. Note that even when a failure occurs in the sealing property of the seal member 48 of the second pilot check valve 10*b*, or when a failure occurs in the sealing property of each of the seal members 48 of both of the first and second pilot check valve 10*a* and 10*b*, since the case in which the seal member 48 of the first pilot check valve 10*a* is damaged as described above applies, the description thereof will be omitted.

In this manner, since the pilot check valves 10*a* and 10*b* of the present embodiment are configured to exhibit the check function in which the check valve element 14 closes the main path 13 in case of an emergency such as stopping of power supply to the direction switching solenoid valve 72 and the pilot pressure supply solenoid valve 75 even when a failure occurs in the sealing property by the seal member 48, pressure fluid (residual pressure) is able to be held as it is in each of the head-side and rod-side pressure chambers 88 and 89 of the fluid pressure cylinder 80.

Figure 5:
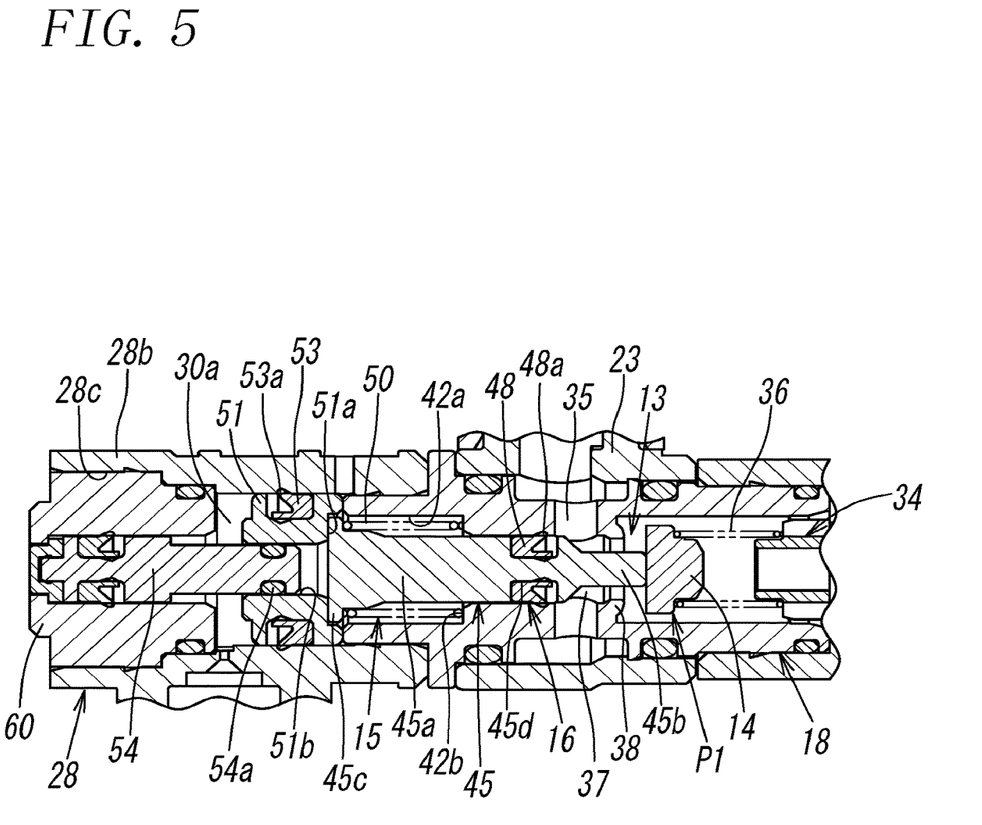
FIG. 5 is a partial sectional view of the pilot check valve in a state where a piston rod is pressed by pilot pressure.

Here, when it is desired to exhaust the residual pressure held in the fluid pressure cylinder 80 from the fluid pressure cylinder 80, in a state where the direction switching solenoid valve 72 is switched to the neutral position 100 and the pilot pressure supply solenoid valve 75 is switched to the first switching position 200, as illustrated in FIG. 5, each piston rod 54 of the pilot check valves 10*a* and 10*b* shall be pressed toward the base end side in the direction of the axis L1.

Figure 6:
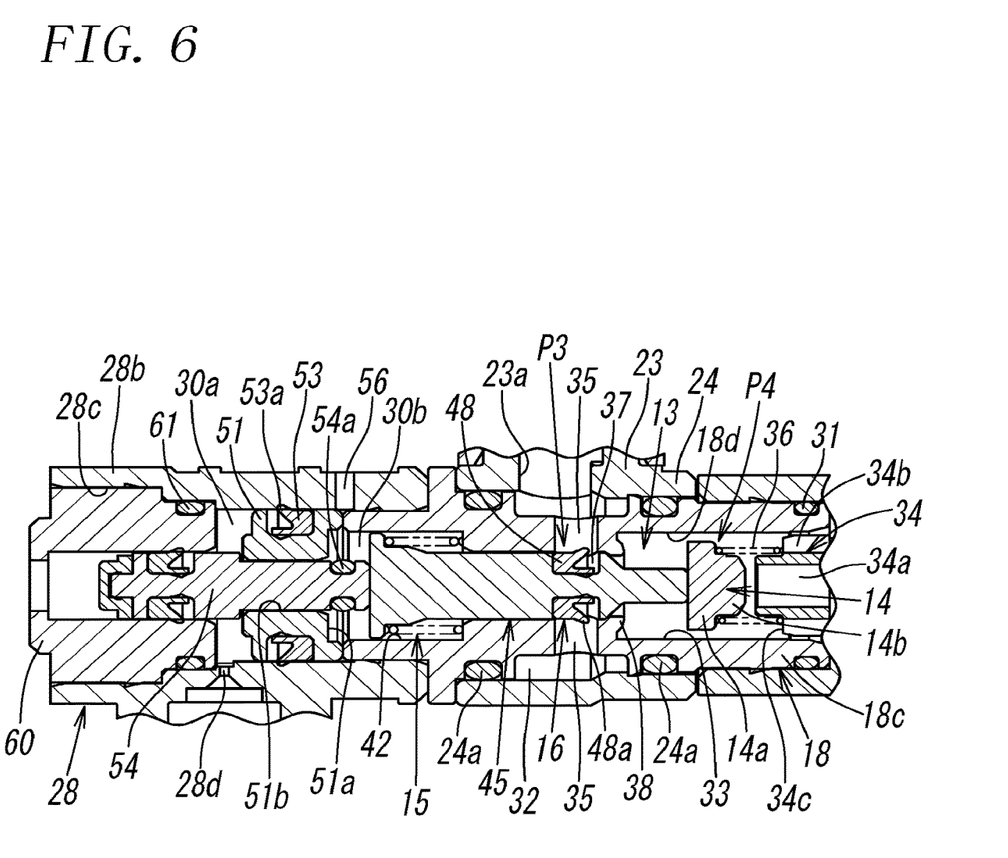
FIG. 6 is a partial sectional view of the pilot check valve in a state where a pressing operation is performed on the piston rod.

After the piston rod 54 is pressed, as illustrated in FIG. 6, the piston rod 54 moves toward the base end side in the direction of the axis L1, and the piston 51 and the push rod 45 also move toward the base end side in the direction of the axis L1. Then, the piston 51 abuts on the leading end portion of the body 18 in the axis direction and is prevented from moving. In addition, the push rod 45 moves toward the base end side in the direction of the axis L1 with respect to the piston 51 and moves the check valve element 14, via the push rod 45, to a second releasing position P4 located further toward the base end side in the direction of the axis L1 than the first releasing position P1. In addition, at the same time, the seal member 48 moves to the central hole 37. As a result, while the check valve element 14 is separated from the valve seat 38 and releases the main path 13, the seal member 48 releases the residual pressure exhaust path 15. Therefore, since the output port 12 is in communication with the pilot port 55 and the exhaust hole 56 through the main path 13 and the residual pressure exhaust path 15, the residual pressure in the head-side pressure chamber 88 of the fluid pressure cylinder 80 can be discharged to the outside through the first pilot check valve 10*a*. In addition, in the same manner as described above, the residual pressure in the rod-side pressure chamber 89 of the fluid pressure cylinder 80 can be discharged to the outside through the second pilot check valve 10*b*.

Note that in the pilot check valve 10 according to the present embodiment, the pilot body 28 having the pilot port 55 is rotatable around the axis L1 (X-axis) with respect to the body 18, the connecting pipe portion 23 is rotatable around the axis L1 with respect to the body 18, the annular body 25 is rotatable around the axis L3 (Y-axis) with respect to the connecting pipe portion 23, and the cylindrical coupling portion 22 is rotatable around the axis L2 (Z-axis) with respect to the main body 21. Therefore, the degree of freedom of arrangement directions of pipes to be connected to ports connected to these bodies can be enhanced.

REFERENCE SIGNS LIST

10, 10*a*, 10*b* Pilot Check Valve
11 Input Port
12 Output Port
13 Main Path
14 Check Valve Element
15 Residual Pressure Exhaust Path
18 Body (First Body)
18*d* Through-Hole
28*e* Opening Portion (Third Opening Portion)
30 Exhaust Valve Chamber
30*a* Pressure Chamber
30*b* Exhaust Chamber
32 First Annular Path (First Opening Portion)
34*a* Communication Hole (Second Opening Portion)
36 First Return Spring
37 Central Hole (Connecting Portion)
45 Push Rod (Operation Unit)
45*d* Ring Groove (Seal Portion, Recessed Groove)
48 Seal Member (Seal Portion)
50 Second Return Spring
51 Piston
54 Piston Rod
55 Pilot Port
56 Exhaust Hole
L1 First Axis (X-Axis)

P1 First Releasing Position
P2 Check Position
P3 Residual Pressure Exhaust Position
P4 Second Releasing Position

The invention claimed is:

1. A pilot check valve comprising:
a first body that has an input port and an output port;
a main path that is provided in the first body and is in communication with the input port and the output port;
a check valve element that is provided in the main path and allows a flow of a pressure fluid from a first side in communication with the input port toward a second side in communication with the output port, the check valve element being selectively moved, by supply or discharge of a pilot fluid, to a position where a flow from the output port toward the input port is blocked and a position where the flow is allowed;
a residual pressure exhaust path having one end connected to a connecting portion formed on the first side of the main path and another end connected to an exhaust hole provided and opened on the first body;
a seal portion that is provided in the residual pressure exhaust path and blocks a flow of a pressure fluid from the connecting portion of the main path toward a side of the exhaust hole; and
an operation unit that is capable of moving the check valve element to a position where a flow of a pressure fluid from the second side toward the first side in the main path is allowed and moving the seal portion to a position where the flow of a pressure fluid from the connecting portion of the main path in the residual pressure exhaust path toward the exhaust hole is allowed.

2. The pilot check valve according to claim 1, wherein
the first body extends in an axial direction, is formed into a cylindrical shape, and has a base end and a leading end at both ends in the axial direction,
the first body has a through-hole that extends inside in the axial direction,
the first body has a first opening portion that opens in a middle portion of the first body in the axial direction and that is in communication with the input port, and a second opening portion that opens in a base end portion of the first body in the axial direction and that is in communication with the output port,
the check valve element is supported and is movable in the axial direction in a base end portion in the axial direction of the through-hole extending in the axial direction, and
the operation unit is accommodated in the through-hole further toward a leading end side than the check valve element in the axial direction and is movable in the axial direction.

3. The pilot check valve according to claim 2, wherein
the operation unit is a rod member that extends along the through-hole,
the rod member has an outer diameter that is smaller than an inner diameter of the through-hole, and
the residual pressure exhaust path is formed of a gap formed between an outer peripheral surface of the rod member and an inner peripheral surface of the through-hole.

4. The pilot check valve according to claim 3, wherein
the seal portion has a recessed groove that is formed into an annular shape on the outer peripheral surface of the rod member, and a seal member that is accommodated in the recessed groove, and
the seal member is a lip-type seal member, the seal member having a lip portion that is formed to be inclined outward in a radial direction toward a base end side in the axial direction.

5. The pilot check valve according to claim 4, wherein
a part of the through-hole in communication with the first opening portion and the second opening portion forms a part of the main path,
the base end portion in the axial direction of the through-hole extending in the axial direction has a valve seat on which the check valve element is capable of abutting, and
the check valve element is capable of moving to a check position where the check valve element abuts on the valve seat and blocks a flow of a pressure fluid from the output port toward the input port, and to a first releasing position where the check valve element moves from the valve seat toward a base end side in the axial direction and allows the flow.

6. The pilot check valve according to claim 5, wherein
the rod member is capable of moving in the axial direction inside the through-hole by receiving a force toward a side of the check valve element,
when the seal member is moved to a residual pressure exhaust position in the connecting portion, the flow of a pressure fluid from the connecting portion of the main path toward the exhaust hole is allowed,
when the check valve element is moved to a second releasing position further toward a base end side in the axial direction than the first releasing position, the flow of a pressure fluid from the second side toward the first side in the main path is allowed,
the rod member is capable of moving the seal member to the residual pressure exhaust position by moving in the axial direction, and capable of moving the check valve element to the second releasing position.

7. The pilot check valve according to claim 6, wherein
the check valve element is provided with a first return spring that biases the check valve element toward a side of the valve seat, and
the rod member is provided with a second return spring that biases the rod member toward a leading end side in the axial direction.

8. The pilot check valve according to claim 6, wherein
the through-hole has an exhaust valve chamber on a leading end side in the axial direction,
the exhaust valve chamber is provided with a piston inside the exhaust valve chamber, the piston dividing the exhaust valve chamber into a pressure chamber and a discharge chamber and being capable of sliding inside the through-hole, and
the first body has a pilot port that introduces pilot pressure into the pressure chamber, and the exhaust hole that is located between the seal member and the piston and is in communication with the discharge chamber and an outside.

9. The pilot check valve according to claim 8, wherein
the rod member further has a piston rod that is disposed on a leading end side in the axial direction of the rod member and that is provided to be movable along the through-hole,
the piston rod has a base end portion in the axial direction inserted and movable in the axial direction with respect to the piston, and
when the piston rod is pressed from a third opening portion that opens at the leading end in the axial direction of the first body toward a base end side in the axial direction, the piston rod is capable of pressing the rod member to move the rod member to the base end side in the axial direction and moving the seal member to the residual pressure exhaust position and capable of moving the check valve element to the second releasing position.

10. The pilot check valve according to claim 2, wherein when the axial direction is an X-axis direction, a direction orthogonal to the X-axis direction is a Z-axis direction, and a direction orthogonal to the X-axis direction and the Z-axis direction is a Y-axis direction, the first body extends in the X-axis direction, the first body is connected, on a base end side in the X-axis direction, to a second body that extends in the Z-axis direction orthogonal to the X-axis direction and that includes the output port at one end, the first body is connected, in a leading end portion in the X-axis direction, to a pilot body that is fitted around an outer periphery of the first body to be rotatable around the X-direction with respect to the first body, the first body is connected to a connecting pipe portion that is fitted around an outer periphery of the first body and rotatable around the X-axis direction further toward a base end side in the X-axis direction than the pilot body, the connecting pipe portion is connected to an annular body that is coupled and rotatable in the Y-axis direction orthogonal to the X-axis direction and the Z-axis direction, and the second body is connected to a cylindrical coupling portion that is fitted to an outer periphery of the second body and rotatable in the Z-axis direction and couples a base end portion of the first body to the second body.

* * * * *